United States Patent

Hinds

[11] Patent Number: 5,965,962
[45] Date of Patent: Oct. 12, 1999

[54] LINEAR STEPPER MOTOR

[75] Inventor: Walter E. Hinds, Beverly Hills, Calif.

[73] Assignee: Northern Magnetics, Inc., Santa Clarita, Calif.

[21] Appl. No.: 09/026,621

[22] Filed: Feb. 20, 1998

[51] Int. Cl.[6] .................................................. H02K 41/00
[52] U.S. Cl. ............................................................ 310/12
[58] Field of Search .............................. 310/12, 13, 14, 310/42; 318/135

[56] References Cited

U.S. PATENT DOCUMENTS

| | | | |
|---|---|---|---|
| 3,376,578 | 4/1968 | Sawyer | 310/13 |
| 4,504,750 | 3/1985 | Onodera et al. | 310/12 |
| 4,661,730 | 4/1987 | Maruyama et al. | 310/12 |
| 5,179,304 | 1/1993 | Kenjo et al. | 310/12 |

*Primary Examiner*—Nestor Ramirez
*Assistant Examiner*—Judson H. Jones
*Attorney, Agent, or Firm*—Oppenheimer, Wolff & Donnelly LLP

[57] ABSTRACT

A stepper motor includes a forcer wherein the teeth are formed in the pole faces by an etching process or machining and instepping. The etching can be achieved by forming the teeth in a separately formed plate which is anchored to the face of a forcer. A high density magnetic material is used for the plate and can also be used on the platen to improve performance of the stepper motor.

27 Claims, 4 Drawing Sheets

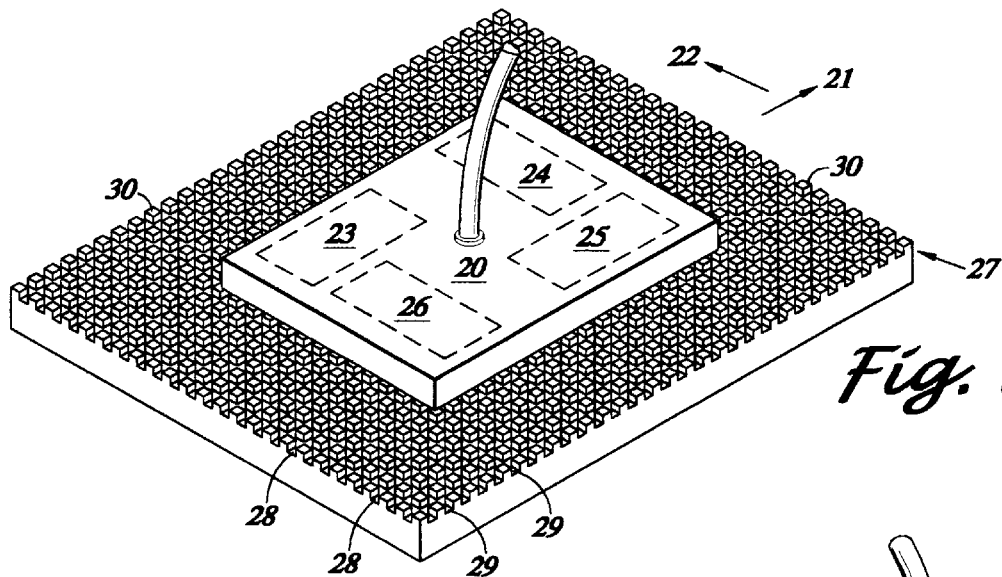
Fig. 3
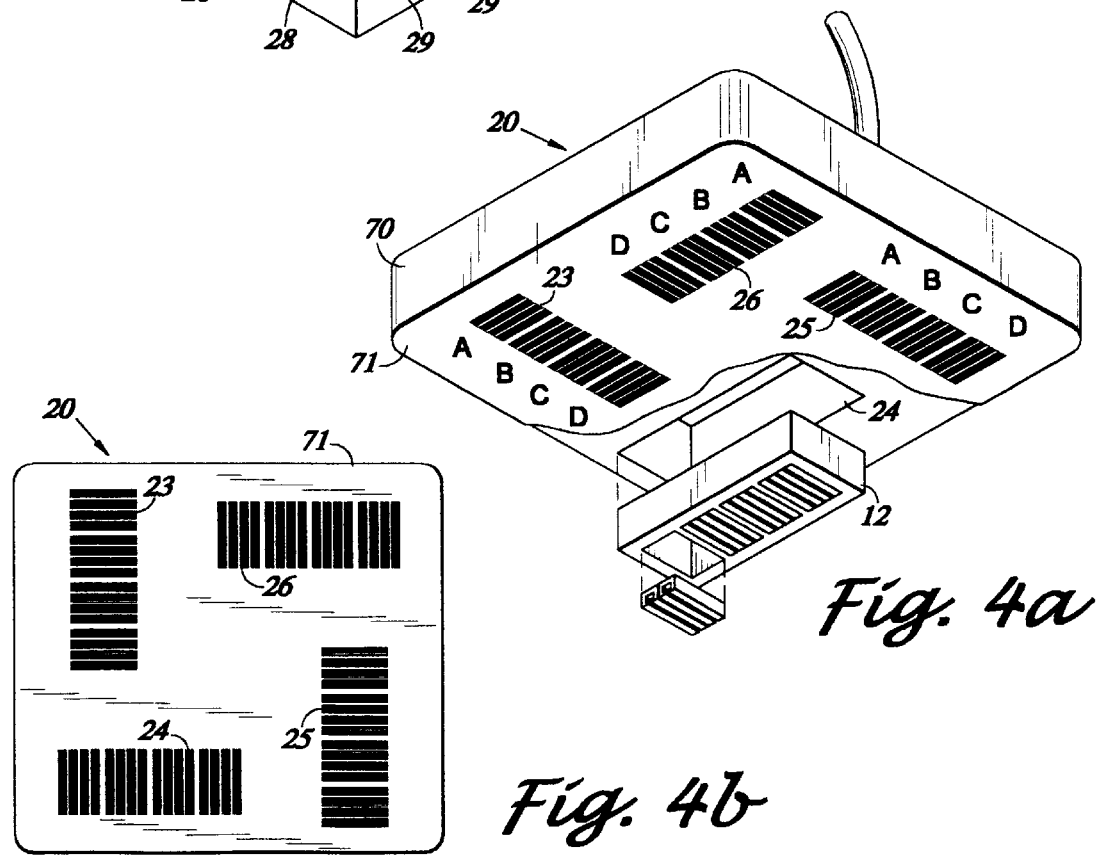
Fig. 4a
Fig. 4b

LINEAR STEPPER MOTOR

BACKGROUND OF THE INVENTION

This invention relates to linear stepper motors. In particular, the invention is concerned with a system for forming components of the linear stepper motor, and for enhancing the operational performance of such motors.

Linear stepper motors are used for positioning applications requiring rapid acceleration and high speed moves with low mass payloads. Mechanical simplicity and precise open loop operation are additional features of the stepper linear motor systems.

A linear stepping motor operates on the same electromagnetic principles as a rotary stepping motor. The stationary part or platen is a passive toothed steel bar extending over the desired length of travel. Permanent magnets, electromagnets with teeth, and bearings are incorporated into the moving elements or forcer. The forcer moves bidirectionally along the platen, assuring discrete locations in response to the state of the currents in the field windings. In general, the motor is two-phase, however a larger number of phases can be employed.

A linear stepper motor is not subject to the same linear velocity and acceleration limitations inherent in systems converting rotary to linear motion. With linear motors, the force generated by the motor is efficiently applied directly to the load and length has no effect on system inertia. Additional benefits of linear stepper motors include:

1. The motors are capable of speeds to 100 ips and the low mass forcer allows high acceleration.

2. The need for lead screws or belts and pulleys is eliminated.

3. Length of travel is limited by the length of the platen, and increasing the platen length causes no degradation in performance.

4. Precise open loop operation is possible, and unidirectional repeatability to 2.5 micron is possible without the added expenses of feedback devices.

5. A linear motor is usually smaller in all three dimensions than comparable systems where rotary motion is converted to linear.

6. More than one forcer can operate on the same platen with overlapping trajectories.

A critical requirement to ensure the accuracy of stepper motors is to have accurate positioning of the teeth in the platen and the teeth in the forcer. Conventionally, it is possible to form the teeth in a platen by an etching process, and the nature of etching is such that these teeth can be accurately positioned. This has not been possible, to accurately form the teeth in the pole faces in the electromagnets forming part of the forcer. Accordingly, a limitation exists in the accuracy of linear stepper motors due to this characteristic.

There is accordingly a need to provide a stepper motor with enhanced ability to accurately position the teeth in the forcer. Moreover, it is desirable to provide systems to increase the magnetic flux density of both the platen and the teeth in the forcer.

SUMMARY OF THE INVENTION

According to the invention, there is provided a linear motor which comprises a forcer for movement over a platen. There are bearing means between the platen and the forcer, and the platen has teeth directed transversely to the direction of movement of the forcer over the platen. The forcer has a series of teeth directed towards the platen, and are for substantially parallel relationship with the teeth and the platen. The teeth in the forcer are created by an etching process which provides for increased accuracy and repeatability.

In one preferred form of the invention the teeth are formed by a plate which is slotted and anchored to the forcer.

Another aspect of the invention is to have the material of the plate of a substantially higher magnetic density than the pole faces forming the electromagnets. The teeth for the platen can also be formed of a magnetic density substantially higher than the magnetic density of the material forming the base for the platen. The teeth of the platen could be formed of a plate to overlay the base.

The invention is concerned with stepper motors directed in the x axis and also in the x and y axes.

The invention is described further with reference to the accompanying drawings.

BRIEF DESCRIPTION OF THE DRAWINGS

FIG. 3 is a perspective view of a platen and a housing for four forcers of a stepper motor for operating in the x and y directions.

FIG. 4a is a partially exploded underview, with part of a base plate broken away, of a housing showing four forcers constituting the stepper motor for operating in the x and y directions.

FIG. 4b is an underview of the base plate for the housing of the four forcers constituting the stepper motor for operating in the x and y directions. For each forcer there are strips of material between slots and teeth.

DETAILED DESCRIPTION OF THE INVENTION

Figure 1:
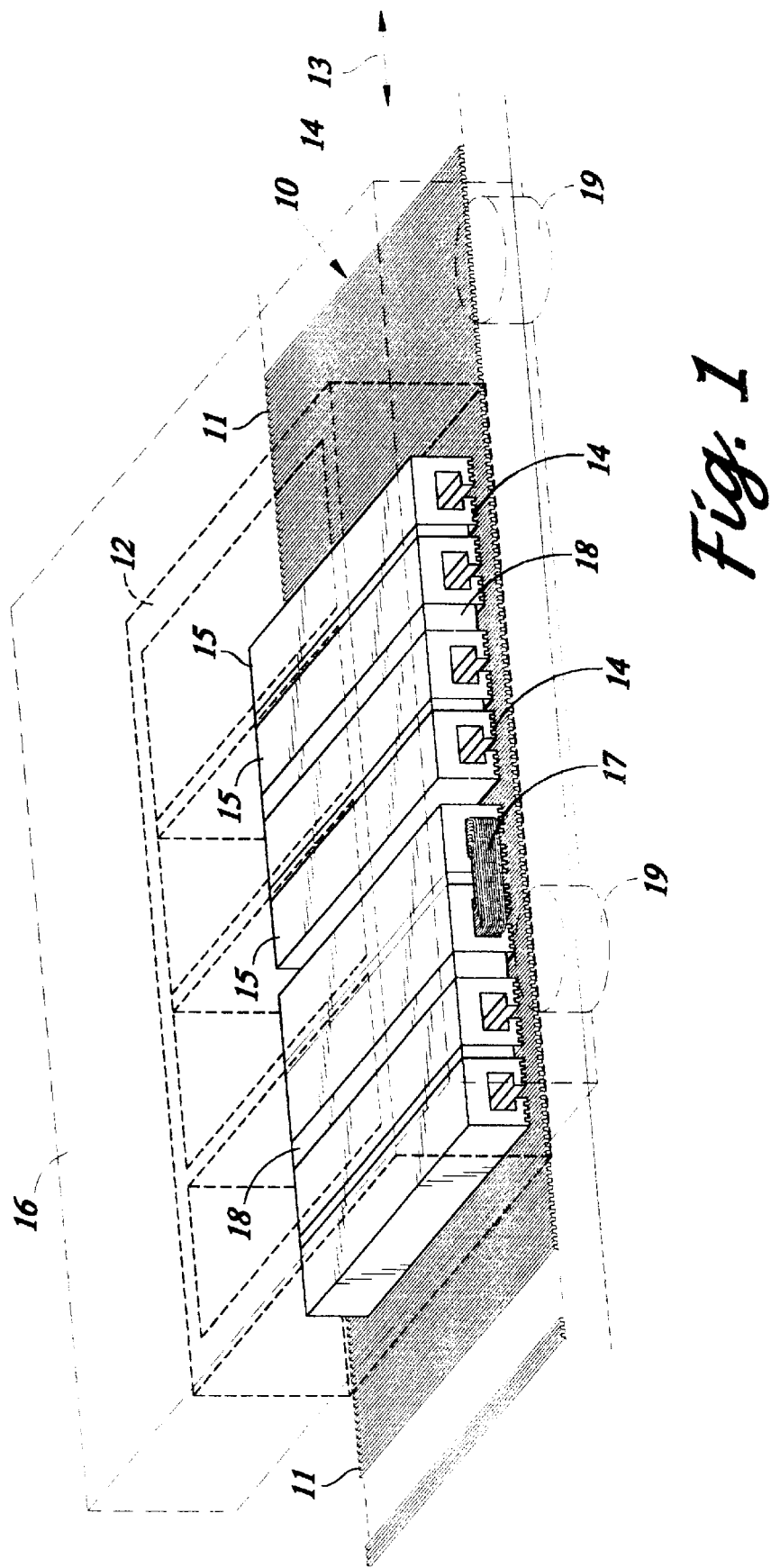
FIG. 1 is a perspective view, with portions shown in phantom of a forcer located on a platen of a stepper motor operable in an x direction.

As shown in FIG. 1, there is a platen 10 which is a steel bar having a teeth 11 on a planar surface. The teeth 11 are directed substantially transversely to the direction of movement of a forcer 12 which moves in the x direction as indicated by arrow 13. The teeth 11 on the surface are all substantially parallel with each other and are parallel to teeth 14 which are formed on the underside of pole faces 15 which constitute part of the forcer 12.

The teeth 14 of the forcer 12 are directed towards the teeth 11 of the platen 10 and are in a substantially parallel relationship to the teeth 11 of the platen 10. The teeth 14 are formed in the face of the pole faces 15 in a manner that will be further described below. The forcer 12 includes a body member 16 for the forcer 12 which locates field windings 17 and permanent magnets 18.

The stepper motor illustrated in FIG. 1 also includes bearings 19, which are mounted on the housing securing the forcer 12. These bearings 19 can be either mechanical roller bearings or air bearings. Mechanical bearings are simple, and the stiffness of the bearing reduces the pitch and roll of the forcer 12. Air bearings are free of mechanical friction, and operate by floating the forcer 12 on high pressure introduced through orifices near the pole faces 15 of the forcer 12. The illustration shown represents mechanical bearings 19.

Figure 2A:
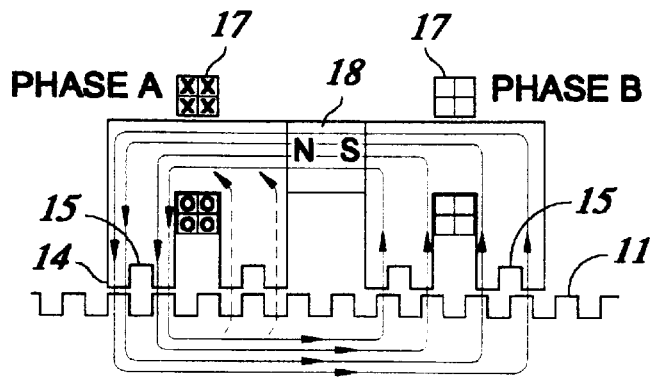
FIGS. 2a–2d are diagrammatic illustrations of the forcer of a stepper motor in relationship to the teeth on a platen.
Figure 2B:
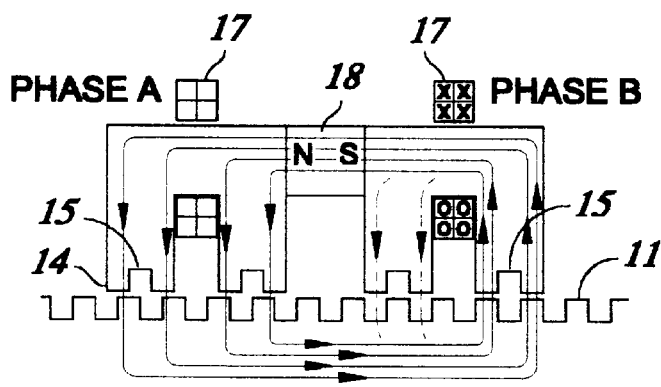
Figure 2C:
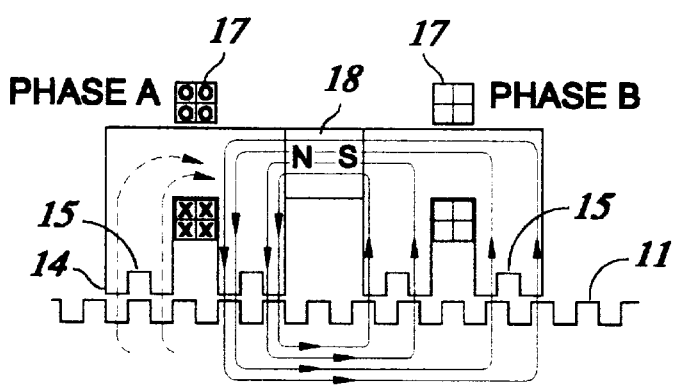
Figure 2D:
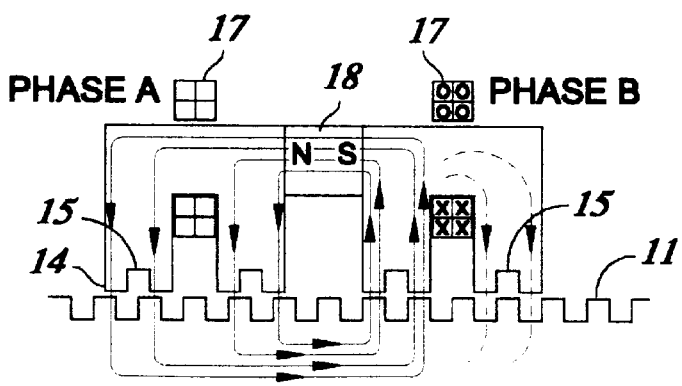

The operation of the linear stepper motor is now described with reference to the operation of the motor where there are two electromagnets in a two-phase motor. FIGS. 2a–2d do not illustrate the invention. The linear stepper motor is microstepped by proportioning current to the two phases of the forcer 12, in a manner similar to rotary stepper motors. The forcer 12 consists of two or four electromagnets (A and B) and a strong rare earth permanent magnet 18. In a two-phase motor there are two electromagnets; in a four-phase motor there are four magnets; in a six-phase motor there are six magnets, etc. FIGS. 2a–2b illustrate two of the electromagnets 18 for simplicity purposes. The two pole faces 15 of each electromagnet are toothed to concentrate the magnetic flux. Four sets of teeth 14 on the forcer 12 are spaced in quadrature so that only one set at a time can be aligned with the platen teeth 11.

The magnetic flux passing between the forcer 12 and the platen 10 gives rise to a strong normal force of attraction between the two pieces. The attractive force can be up to ten times the peak holding force of the motor. This requires a bearing arrangement to maintain precise clearance between the pole faces 15 and platen teeth 11.

When current is established in a field winding 17, the resulting magnetic field tends to reinforce permanent magnetic flux at one pole face 15 and cancel it at the other. By reversing the current, the reinforcement and cancellation are exchanged. Removing current divides the permanent magnetic flux equally between the pole paces 15. By selectively applying current to phase A and B, it is possible to concentrate flux at any of the forcer's four pole faces 15. The face 15, receiving the highest flux concentration, attempts to align its teeth with the platen 10. FIGS. 2a–2d show the different flux paths, and depict the four states or full steps of the forcer 12. The four steps result in motion of one tooth interval to the right. Reversing the sequence moves the forcer 12 to the left.

Repeating the sequence causes the forcer 12 to continue movement. When the sequence is stopped, the forcer 12 stops with the appropriate tooth set aligned. At rest, the forcer 12 develops a restoring or holding force which opposes any attempt to displace it from equilibrium. The restoring force increases until the displacement reaches one-fourth of a tooth interval.

In FIG. 3 there is illustrated a motor housing 20 which is operational in both in x direction 21 and in y direction 22. The housing 20 has four motors 23, 24, 25, and 26 for moving over a platen 27 formed of magnetic materials such as iron. There are two sets of parallel grooves 28 and 29. Grooves 28 are directed in the x axis, and grooves 29 are directed in the y axis. The two sets of grooves 28 and 29 therefore provide magnetic teeth 30 having a square cross-section. The outstanding teeth 30 and the grooves 28 and 29 provide for the magnetic energy configuration which is used in cooperation with the electromagnetic means in the housing 30 as constituted by the four forcers 23, 24, 25, and 26. As such, they provide for movement of the head or housing 20 in the x and y axes 21 and 22 respectively.

FIG. 4a illustrates the underside of the head or housing 20. There can be seen a plurality of forcers 23, 24, 25, and 26 mounted in a base 70. Each forcer is like the forcer 12. The forcers 23, 24, 25, and 26 have mounted collectively in relation to a single plate 71 so that they cooperate with the platen 27. The electromagnetic means are divided here to show the four pole faces A, B, C, and D, which represent the A, B, C, and D magnetic phases which are detailed more particularly in each of the four pairs of electromagnets shown in FIG. 1. With this arrangement, the housing or head 20 can move over the platen 27 according to the operation of the respective forcers 23, 24, 25, and 26 in a similar manner to that described with regard to FIGS. 2a–2d.

In FIG. 4b there is shown the single plate 71 which is for location on the base 70. A suitable fixation means can be provided for securing the plate 71 with the base 70. By having all the teeth 14 formed by material slots 51 cut into the single plate 71, rather than having the teeth set up individually for each of the four forcers, it is easier to obtain the relative registration of the four forcers relative to each other. In some other cases there can be individual plates provided for each of the forcers. Each forcer 23, 24, 25, and 26 has an arrangement of teeth 14 formed between slots 51 and between material 52 in a manner similar to that shown in FIGS. 5, 6a, 6b, or 6c.

Figure 5:
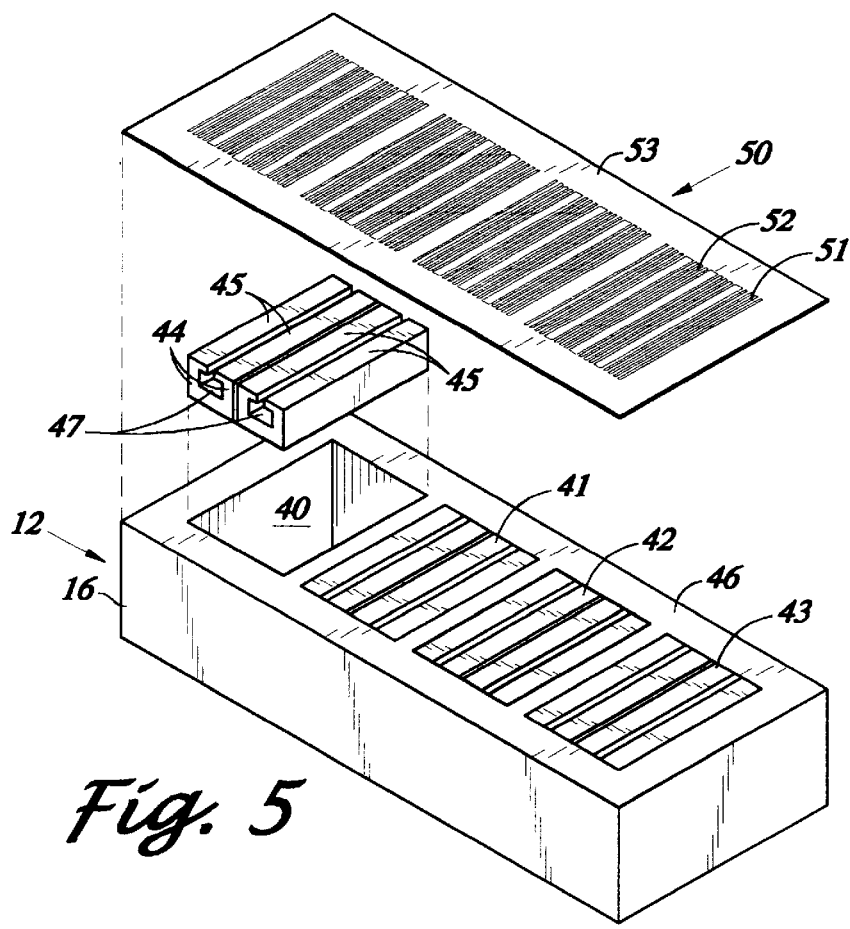
FIG. 5 is an exploded view of a forcer showing the body, permanent magnets, pole pieces and the slotted plate for forming the teeth on the forcer.

FIG. 5 illustrates one aspect of the inventive concept in forming the forcer 12. For either a linear stepper motor to operate in the x direction 21 or multiple forcers to have a linear stepper motor operate in the x and y directions 21 and 22 respectively, the forcer 12 has a body member 16 with four compartments 40, 41, 42, and 43 respectively. Inside each of these compartments there is located an electromagnetic configuration which has four pole pieces 44 directed outwardly from the compartment 40 such that there are pole faces 45 directed to the substantially flush with the top phase 46 of the body 16. Within the space 47 there is a suitable field winding 17 that is located between the two sets of pole pieces 44. In each of the compartments, there is a permanent magnet 18. Four of these constructions are formed in the body member 16 to create the forcer 12.

Conventional practice has been to form in the poles faces 45 teeth which are substantially parallel to the teeth in a platen. By the invention, however, there is provided a separate plate 50 where there are provided spaced slots arranged in sets of four corresponding to the faces 45 of the each of the pole pieces 44. The pole pieces 44 themselves are flat and not provided with the teeth. The teeth 14 are effectively constituted by the strips of material 52 between each of the slots 51. Around the slots 51 there is a perimeter of material 53, and this material is anchored to the face 46 of the top of the body 16.

By this arrangement, the plate 50 is suitably etched through a photoetching process so that the slots 51 can be extremely accurately formed in the face 46 of the plate 50. In this manner, there is provided a system for forming accurately spaced teeth to constitute the pole faces 44 of the forcer 12. Instead of etching, this can be done by machining, namely cutting or stamping.

To complete the construction of the face for adjacency with the teeth of the platen, the slots 51 are epoxy filled. The exposed face of the plate 50 is subjected to grinding to provide a smooth surface. Thereafter, diamond lapping can be provided to provide a high quality finish to the product.

The material forming the plate 50 can be high flux density Vanadium Permidor™ which has a maximum flux density of about 21,000 gauss. This would compare with the conventional steel which has a flux density of about 14,000 gauss, and which is the normal material from which a pole piece is made. The teeth flux density is twice that of the poles and back-iron. Since Vanadium Permidor™ is considerably more expensive than steel, it is now possible to provide teeth of higher flux density thereby providing an effective forcer having an effective high flux density concentration where it is needed, namely, in the zones of the teeth, but not in the pole pieces themselves. Thus, although Vanadium Permidor™ is a considerably more expensive material, the net result is a combination product which is high quality, high performance, and considerably less a cost than if the entire product was made of a higher magnetic density material. The motor force is proportional to the square of the tooth flux density.

For the motor to operate in the high force mode, both platen and forcer teeth are made of hi-flux density material such as Vanadium Permidor™. Since in a 0.040 in. pitch motor the etched plates on both the forcer and the platen are less than 0.020 in. thick, the cost of using Vanadium Permidor™ is relatively small.

Similarly, the teeth 30 of the platen 27, or the teeth 11 of the platen 10, can be made of a high magnetic flux density material, whereas the relative bases can be of a lower flux density material. Overall, there is therefore provided a system for interacting a forcer with a platen with components having a high flux density characteristic in a manner which has not previously before been anticipated. The teeth for the platen can be made in a plate which is then bonded to the base member.

Figure 6A:
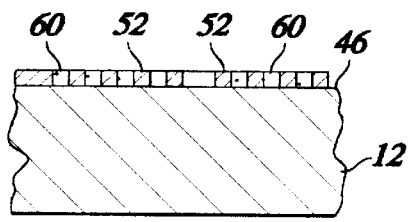
FIGS. 6a–6c are cross-sectional diagrammatic side views of forcers showing different relationships of the slotted plate in relationship to the body of the forcer.
Figure 6B:
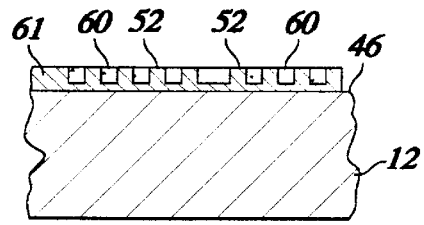
Figure 6C:
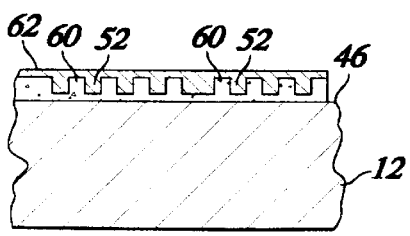

FIGS. 6a, 6b, and 6c illustrate three of the different embodiments by which the plate 50 can be formed relative to the face 46 on the forcer 12.

In FIG. 6a there is shown strips 52 with the epoxy etching material in what would otherwise have been the slots 51. The embodiment shown in FIG. 6b shows a partially etched plate with epoxy 60 filling the spaces between the teeth 52. There is still retained a thin sliver of material 61 below each of the slots 51 which is filled with epoxy 60. The advantage of this arrangement is to prevent the buckling of the thin strips 52 in the plate, especially when the plate is put into adjacency with the high magnetic field elements in the forcer body 12. In FIG. 6c the arrangement is shown where a sliver of material is retained. The sliver of material 62 is on the top of the teeth. All strips of material 52 face downwardly. The sliver 62 is thereafter ground off, leaving the strips of material 52 and epoxy 60.

Many other forms of the invention exist each differing from others. The invention is to be determined solely by the following claims.

What is claimed is:

1. A linear motor comprising:
   a forcer for movement over a platen,
   bearing means between the platen and the forcer,
   the platen having teeth directed transversely to the direction of movement of the forcer over the platen, the forcer having a series of teeth directed towards the platen and being for substantially parallel relationship with the teeth in the platen, and
   the teeth in the forcer being formed by a plate which is slotted and anchored to a face of a body member of the forcer for locating field windings, electromagnets, and a permanent magnet, and wherein the electromagnets form pole faces and the slots of the plate align with the pole faces.

2. A motor as claimed in claim 1 wherein the plate is formed of a material of magnetic density substantially higher than the magnetic density of the pole faces.

3. A motor as claimed in claim 2 wherein platen includes a base and the teeth in the platen are formed of a material having a magnetic density substantially higher than the magnetic density of the base.

4. A motor as claimed in claim 1 wherein the platen includes a base and the teeth in the platen are formed of a material having a magnetic density substantially higher than the magnetic density of the base.

5. A motor as claimed in claim 1 including a filler material in the slots between the teeth.

6. A motor as claimed in claim 2 including a filler material in the slots between the teeth.

7. A motor as claimed in claim 1 wherein the slots are formed by at least partial etching.

8. A motor as claimed in claim 1 wherein the slots are etched in the plate so as to form slots through the plate.

9. A linear motor as claimed in claim 1 wherein the teeth in the forcer are created selectively by a process of etching or machining.

10. A motor as claimed in claim 1 mounted in a housing, and including at least multiple other forcers mounted in the housing whereby motion of the housing is effected in a x direction and y direction, and the platen includes teeth transversely directed in the x and y directions.

11. A forcer for a linear motor having the forcer for movement over a platen, bearing means between the platen and the forcer, the platen having teeth directed transversely to the direction of movement of the forcer over the platen, the forcer having a series of teeth directed towards the platen and being for substantially parallel relationship with the teeth in the platen, and wherein the forcer includes a plate which is slotted to form the teeth, the plate being anchored to a face of a body member for locating field windings, electromagnets, and a permanent magnet, and wherein the electromagnets form pole pieces and the slots of the plate align with faces of the pole pieces.

12. A forcer as claimed in claim 11 wherein the plate is formed of a material of magnetic density substantially higher than the magnetic density of the pole pieces.

13. A forcer as claimed in claim 11 wherein the plate is formed of a material of magnetic density substantially higher than the magnetic density of the pole pieces.

14. A forcer as claimed in claim 11 including a filler material in the slots between the teeth.

15. A forcer as claimed in claim 11 wherein the teeth are partially etched.

16. A forcer as claimed in claim 11 wherein the teeth are at least fully etched in the plate so as to form slots through the plate.

17. A forcer as claimed in claim 11 mounted in a housing, and including at least one other forcer is mounted in the housing whereby motion of the housing is effected in an x direction.

18. A forcer as claimed in claim 11 mounted in a housing, and including at least multiple other forcers mounted in the housing whereby motion of the housing is effected in a x direction and a y direction, and the platen includes teeth transversely directed in the x and y directions.

19. A method of manufacturing a forcer for a linear motor comprising providing a plate with slots to form teeth between the slots, anchoring the plate to a face of a body member for locating field windings, electromagnets, and a permanent magnet, the electromagnets forming pole pieces, and aligning the slots of the plate with faces of the pole pieces.

20. A method as claimed in claim 19 wherein the plate is formed of a material of magnetic density substantially higher than the magnetic density of the pole pieces.

21. A method as claimed in claim 19 wherein the plate is formed of a material of magnetic density substantially higher than the magnetic density of the pole pieces.

22. A method as claimed in claim 19 including a filler material in the slots between the teeth.

23. A method as claimed in claim 19 wherein the teeth are partially etched in the plate.

24. A method as claimed in claim 19 wherein the teeth are at least fully etched in the plate so as to form slots through the plate.

25. A method as claimed in claim 19 including the step of manufacturing a platen for the linear motor comprising forming the platen to include a base and teeth, and wherein the teeth in the platen are formed of a material having a magnetic density substantially higher than the magnetic density of material of the base.

26. A method as claimed in claim 25 wherein the platen includes teeth transversely directed in the x direction.

27. A method as claimed in claim 25 wherein the platen includes teeth transversely directed in the x and y directions.

* * * * *